Patented Aug. 11, 1953

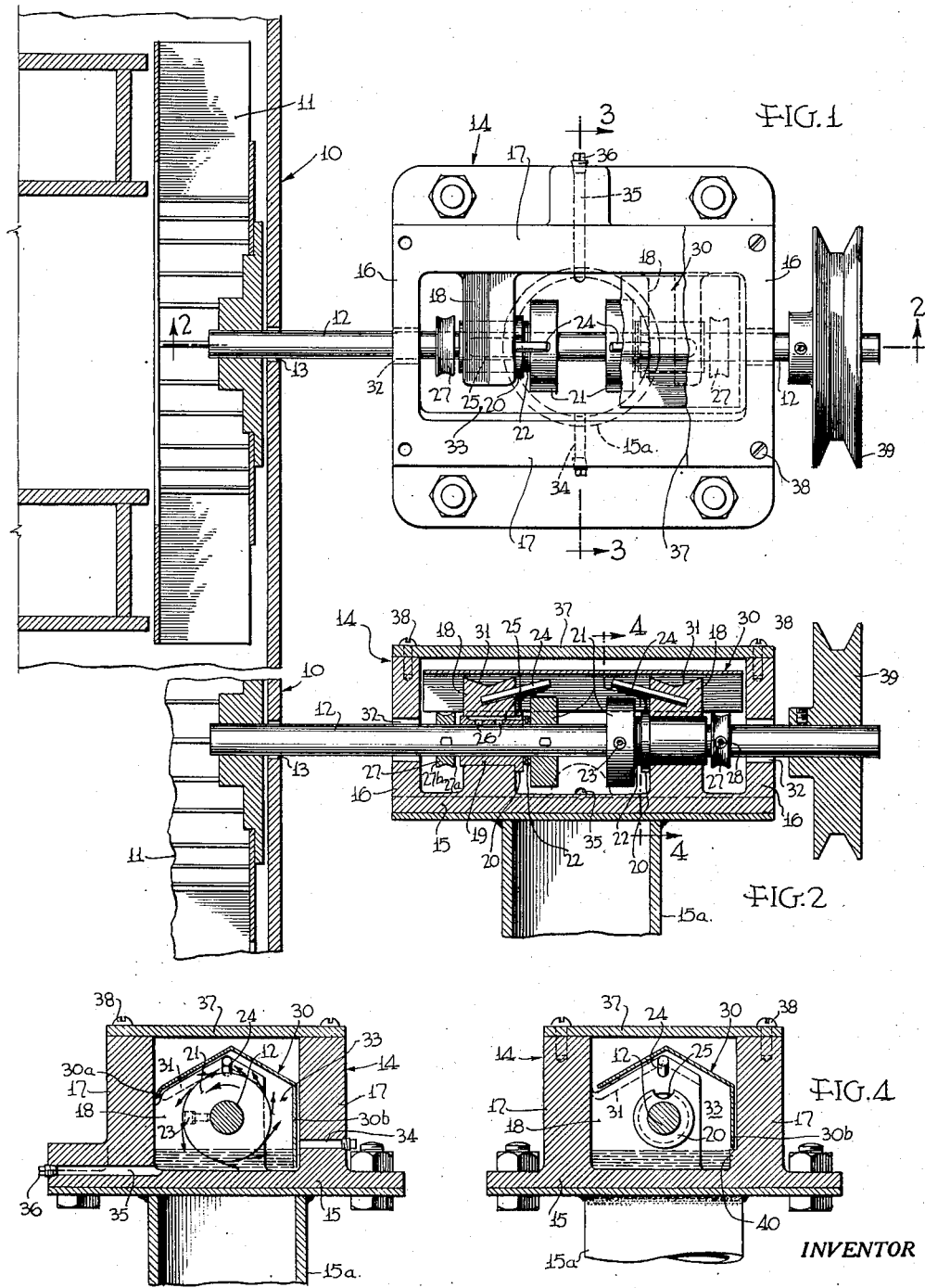

2,648,575

UNITED STATES PATENT OFFICE 2,648,575

SHAFT BEARING

William S. Anderson, Williamsport, Pa., assignor of one-half to James E. Axeman, Williamsport, Pa.

Application December 13, 1949, Serial No. 132,695

9 Claims. (Cl. 308—127)

This invention relates to shaft bearings, especially to bearings which are exposed to high temperatures, and has for an object the provision of improvements in this art.

One of the particular objects is to provide a bearing which is constantly bathed in a changing supply of oil whereby it is kept cool although it may be located near highly heated apparatus such as a fuel furnace. It may be mentioned that the bearing has been developed for the shaft of a fan which operates in the exhaust gas flue of a coal burning furnace where it is necessary to place the bearing very close to the fan to avoid shaft bending and vibration and where consequently the temperature is very high.

Another object is to provide constant and ample aeration of the oil to keep it cool.

Another object is to provide simple and inexpensive means for catching and returning the oil which is thrown out for lubrication and aeration.

Another object is to provide improved means for preventing escape of oil by creep along the shaft, especially that incident to stopping and starting.

The above and other objects and advantages of the invention will be apparent from the following description of a preferred exemplary embodiment, reference being made to the accompanying drawings thereof, wherein:

Fig. 1 is a horizontal plan and section of a bearing assembly embodying the invention, the cover means being omitted to show parts normally concealed thereby;

Fig. 2 is a longitudinal vertical section with the cover means in place, the section being taken on the line 2—2 of Fig. 1;

Fig. 3 is a transverse vertical section taken on the line 3—3 of Fig. 1; and

Fig. 4 is a transverse vertical section taken on the line 4—4 of Fig. 2 but showing a slightly modified support for the inner cover.

Referring to the drawings, a furnace flue 10 is provided with an interior fan 11 mounted on a shaft 12. The shaft extends out of the flue wall through an oversized opening 13 to a supporting bearing assembly which is generally designated by the numeral 14. The bearing assembly is carried by a base 15 which is supported by any suitable means, such as a pedestal 15a, which absorbs vibration without transmitting it to the furnace assembly but which does not permit sufficient movement of the shaft 12 to permit it to engage the furnace casing at the oversized hole 13.

The base 15 carries upstanding end walls 16 and side walls 17 which together with the base or bottom constitute a box or well for containing a supply of oil. Within the box there are provided axially spaced bearing supports 18 housing bearing liners or assemblies 19. The liners have end flanges 20 facing each other in an intermediate compartment and adjacent these flanges the shaft is provided with oil slinger disks 21 spaced from the flanges by fiber washers 22. The slinger disks are secured, as by screws 23, to the shaft and the arrangement constitutes end thrust bearings which retain the shaft in proper axial position.

The bearing supports 18 are provided with outwardly inclined drip pins 24 which catch oil thrown up by the slinger disks and cause it to creep downward to the sides of the supports and there run down on the ends of the bearing liners 19. These liners are provided with oil grooves 25 leading to holes 26 above the shaft.

Some oil passes outward along the shaft from the bearings and for the purpose of halting this movement there are provided grooved slinger disks 27 which are secured to the shaft, as by set screws 28. These slinger disks 27 are smaller than the disks 21 and do not dip into the oil bath, consequently only throw out such oil as creeps along the shaft. Specifically, it is the inner edge 27a of each disk 27 which throws out oil during normal rotation of the shaft. When the shaft stops turning the oil which remains on the disks 27 runs down into the grooves and when the shaft is again rotated this oil is thrown out from both the inner edge 27a and the outer edge 27b.

Excess oil thrown out by all slinger disks is stopped by a cover shield 30 which rests on the sloping tops of the bearing supports 18 and extends to or near the bottom of the oil box. The sloping tops of the supports are provided with grooves 31 which at the lower end are cut away on one or both sides to allow the oil collecting therein to run back into the bath of oil in the bottom of the box. The lower front edge of the shield is bent down at 30a to cause oil to drip off. The rear side 30b of the shield extends down far enough to prevent oil from being thrown up behind the shield. The shield stops short of the ends of the box to avoid oil creep to the ends. The ends are left open around the shaft at 32 above the oil bath for free movement of air through the bearing assembly to cool the oil thrown out by the slinger disks. The rear portion of the bearing supports 18 is cut away to leave openings 33 beneath the shield for the air movement.

An overflow opening 34 controls the level of the oil bath. It is shown to be closed by a plug but it is understood to be connectible to a pump sump. Another opening 35 which is normally closed by a plug 36 is provided for draining oil from the box.

The box is covered by a cap 37 which is retained by any suitable means, such as screws 38. The shaft is driven by a pulley 39 on the outer end away from the heat of the furnace.

It is seen from the above description that an oil bath of fixed amount is kept in the bearing box and that when the shaft rotates the slinger disks 21 throw out a considerable amount of oil against the under surface of the shield or cover 30. A part of the oil thrown out strikes the drip pins 24 and creeps down the lower surface thereof until it reaches the sides of the bearing supports 18 where it then runs down into the oil grooves 25 and thence to the shaft. The shaft is thereby constantly and generously supplied with fresh cool oil.

Such oil as passes outward from the bearings along the shaft is thrown out by the small slinger disks 27 so that no oil escapes from the bearing box along the shaft.

The heavy spray of oil which is thrown out by the large dipping slinger disks 21 and which strikes the under surface of the shield 30 causes an endwise flow along the shield but this flow is largely stopped by the supports 18 on which the shield rests and the grooves 31 assist in confining this outward flow. Some oil may flow to the outer ends of the shield and some further oil is thrown out to these ends by the small slinger disks 27 but since the shield ends stop short of the box ends no oil will flow from the shield ends to the box ends. The downturned edge 30a between bearing supports keeps the shield in proper position axially. If desired, the shield may be fastened, as by screws, but because of its shape and disposition such securement is not necessary and it is sufficient merely to lower the shield down upon its supports.

A supporting ledge 40 for the rear side 30b of the shield is illustrated in Fig. 4 and this allows oil to drain off from the entire shield so that it does not drip when removed, but, if desired, this ledge may be omitted, allowing the shield side 30b to extend to the bottom of the oil bath as shown in Fig. 3.

From the above description it will be seen that a well-oiled, well-aerated, well-cooled and very simple and inexpensive bearing assembly has been provided.

While one embodiment of the invention has been illustrated and described, it will be understood that there may be various embodiments within the general scope of the invention.

I claim:

1. A bearing assembly comprising in combination, a shaft, a bearing housing, spaced bearing supports and bearings for said shaft within said housing and spaced from the ends thereof, oil slinger disks secured to said shaft between said supports and acting therewith to form end thrust bearings for the shaft, sloping drip pins secured above said disks and shaft bearings for catching oil from the disks and feeding it to said shaft bearings, small grooved oil slinger disks on said shaft outside said supports for throwing out oil creeping along the shaft, and a slope-sided splash shield resting on said supports and covering all of said slinger disks, said supports having drain grooves beneath said shield, said shield terminating short of the ends of said housing, the ends of said housing being open, and said supports having openings beneath said shield.

2. A shaft bearing assembly comprising in combination, a shaft, a shaft bearing box holding a bath of oil, a bearing support carrying a shaft bearing above the oil bath level, oil slinging means carried by said shaft at one side of said bearing and normally dipping in the bath of oil, means for catching oil thrown out and conveying it to the bearing, oil slinging means on the other side of said bearing and normally standing above the oil bath level for throwing off oil creeping along the shaft, an inside roof-shaped cover removably carried by the bearing support and covering both of said oil slinging means, and a structural cover secured to the top of the box above and spaced from said roof-shaped cover.

3. A shaft bearing assembly comprising in combination, a shaft, a box-shaped casing having a bottom and side walls and end walls for holding an oil bath in its lower portion, bearing supports within the casing carrying spaced bearings above the oil bath, said supports having a top portion sloping downward to the side walls of the casing, oil slinger means on said shaft dipping into the oil bath, a cover shield resting on the tops of said supports over said slinger means and bearings, and supporting elements for said cover shield, said supporting elements having oil collecting and draining grooves in their sloping tops beneath the cover for returning oil to the bath and preventing oil from flowing outward along the cover.

4. A shaft bearing assembly comprising in combination, a shaft bearing box having a bottom and side walls and end walls for holding a bath of oil, shaft bearing supports disposed in said box and providing shaft bearings above the oil bath, oil slinger means throwing off oil centrifugally, inclined pins disposed above the slinger means which catch some of the oil thrown off and lead it to the bearings, and a cover carried within the box on the bearing supports and covering said oil slinger means for catching oil thrown off, said cover sloping downwardly at the sides toward the sidewalls of the box to drain oil back into the bath.

5. A shaft bearing assembly comprising in combination, a shaft bearing box holding a bath of oil, shaft bearing supports disposed in said box and providing shaft bearings above the oil bath, oil slinger means throwing off oil centrifugally, inclined pins disposed above the slinger means which catch some of the oil thrown off and lead it to the bearings, and a cover carried within the box on the bearing supports and covering said oil slinger means for catching oil thrown off, said cover sloping downwardly at the sides to drain oil back into the bath, and said cover on the upwardly moving side of the slinger means extending downward to form a closure within the box down to the oil bath level.

6. A shaft bearing assembly comprising in combination, a shaft bearing box holding a bath of oil, shaft bearing supports disposed in said box and providing shaft bearings above the oil bath, oil slinger means throwing off oil centrifugally, inclined pins disposed above the slinger means which catch some of the oil thrown off and lead it to the bearings, and a cover carried within the box on the bearing supports and covering said oil slinger means for catching oil thrown off, said cover sloping downwardly at the sides to drain oil back into the bath, and said cover being shorter than the inside length of the box and being provided with means cooperating with said supports for keeping its ends spaced from the ends of the box.

7. A shaft bearing assembly comprising in combination, a shaft bearing box having a bottom and side walls and end walls for holding a bath of oil, upstanding bearing supports within said box and spaced from its side and end walls, a shaft rotatably supported within bearings in said supports, the end walls of the box having oversized openings around the shaft above the oil level providing air passages along the shaft, oil slinger disk means on the shaft dipping in the oil bath between the bearing supports which throw off oil centrifugally during rotation of the shaft, means spaced at a distance above the slinger disk means for catching a limited amount of oil thrown off, means for conducting oil from said oil catching means to said bearings, oil slinger disk means on the shaft between the end walls of the box and bearing supports standing clear above the oil bath, a cover resting upon said bearing supports and covering all of said slinger disk means for stopping oil thrown out, said bearing supports and cover being spaced from the box walls to allow air to flow freely through the box and over said oil slinger disk means.

8. A shaft bearing assembly comprising in combination, a bearing box having a bottom and side walls and end walls for providing a basin for a bath of oil and shaft bearing supports carrying shaft bearings above the oil level in the basin, a shaft carrying centrifugal oil slinger means within said box including the one near each end of the box, a roof-shaped cover resting on said supports extending the full length of the box except for clearance at the ends which catches all excess oil thrown out and returns it to said bath, the box, supports and cover providing free space along the length of the shaft through the assembly for the passage of air to cool the bath and slinger means, and a top cover closing the box above the roof-shaped cover.

9. A bearing assembly comprising in combination, a shaft, a box-like oil-holding bearing housing, a shaft bearing and support therefor within said housing and spaced inwardly from the ends thereof, grooved oil slinger disks secured on said shaft adjacent the ends of the housing and beyond said bearing and support, means on said shaft forming thrust bearing elements to resist end thrust of said shaft against said bearing support, the housing having ends providing clearance around said shaft, and a roof-like shield mounted above said shaft and its bearings and slinger disks, said roof-like shield having sides sloping toward the sides of the housing, extending the full length of the housing except for a clearance space at each end, and being mounted for quick removal without disturbing the shaft mounting in the housing.

WILLIAM S. ANDERSON.

References Cited in the file of this patent

UNITED STATES PATENTS

| Number | Name | Date |
|---|---|---|
| 1,397,115 | Smith | Nov. 15, 1921 |
| 1,561,076 | Heitman | Nov. 10, 1925 |
| 1,989,619 | Ledeen | Jan. 29, 1935 |
| 2,012,009 | Hobart | Aug. 20, 1935 |
| 2,430,236 | Mercier | Nov. 4, 1947 |

FOREIGN PATENTS

| Number | Country | Date |
|---|---|---|
| 15,699 | Great Britain | 1893 |